United States Patent
Bauer et al.

(10) Patent No.: US 7,688,757 B2
(45) Date of Patent: Mar. 30, 2010

(54) METHOD AND APPARATUS FOR ASSESSING SOURCED ELEMENTS

(75) Inventors: Eric Jonathan Bauer, Freehold, NJ (US); Paul Hampton Franklin, Colts Neck, NJ (US); David A. Gatenby, Monmouth Beach, NJ (US); Meenakshi Sharma, Bethlehem, PA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 578 days.

(21) Appl. No.: 11/618,107

(22) Filed: Dec. 29, 2006

(65) Prior Publication Data

US 2008/0163173 A1    Jul. 3, 2008

(51) Int. Cl.
    *H04L 12/28*    (2006.01)
(52) U.S. Cl. .................. 370/254; 717/122; 709/223
(58) Field of Classification Search .................. None
    See application file for complete search history.

(56) References Cited

U.S. PATENT DOCUMENTS

| 5,805,899 | A | * | 9/1998 | Evans et al. ................. 717/170 |
| 5,845,077 | A | * | 12/1998 | Fawcett ........................ 709/221 |
| 7,191,435 | B2 | * | 3/2007 | Lau et al. ..................... 717/168 |
| 7,331,063 | B2 | * | 2/2008 | Gunyakti et al. .............. 726/30 |
| 2006/0130046 | A1 | * | 6/2006 | O'Neill ....................... 717/168 |

* cited by examiner

*Primary Examiner*—Frank Duong
(74) *Attorney, Agent, or Firm*—Wall & Tong, LLP

(57) ABSTRACT

The invention includes a method and apparatus for assessing an available version of a sourced element. The method includes obtaining a description of an available version of the sourced element, identifying a plurality of evaluation items for the sourced element by evaluating the description using at least one evaluation category including a plurality of evaluation parameters, and determining an overall assessment of the available version of the sourced element using the identified evaluation items for the sourced element. The overall assessment is indicative of a value associated with the available version of the sourced element. The method may further include generating overall assessments of other available versions of a sourced element or generating overall assessments of available versions of other sourced elements, and prioritizing the available versions of the sourced elements using the overall assessments of the available versions of the sourced elements.

19 Claims, 11 Drawing Sheets

100

200

400

500

700

METHOD AND APPARATUS FOR ASSESSING SOURCED ELEMENTS

FIELD OF THE INVENTION

The invention relates to the field of software development and, more specifically, to evaluating sourced elements.

BACKGROUND OF THE INVENTION

As technology advances, systems/solutions providers develop and offer software applications including increasingly larger numbers of software modules. In order to reduce development costs, software applications offered by providers increasingly utilize software modules from commercial suppliers and open source projects (in place of developing all software modules in-house). While using software modules from commercial suppliers and open source projects provides some advantages for systems/solution providers, using software modules from commercial suppliers and open source projects also results in different costs for systems/solutions providers, and presents many additional challenges for systems/solutions providers, especially in terms of managing resources during the development cycle.

There are different development costs associated with using software modules from commercial suppliers and open source projects. In general, the development costs are related to the number of third-party software modules integrated into the product, and differences in the sizes of originally-deployed versions and the newly-available versions of the software modules. These development costs typically cause providers to carefully determine which sourced software modules should be patched/updated/upgraded (and which patches/updates/upgrades should be ignored). Disadvantageously, however, due to the large number of third-party software modules used by providers in software applications, rather than reviewing every software patch, update, and upgrade of every sourced module in the software application, providers often direct resources toward other development areas/activities perceived to be more important to the overall development of the software application.

Since such sourced modules are developed by numerous different commercial suppliers and open source projects, software patches, updates, and upgrades are on independent development schedules and, thus, there are rarely synchronization points when providers have an opportunity to review and update all the different third-party software modules. Additionally, as the software development cycle progresses it becomes increasingly difficult for providers to introduce patches, updates, and upgrades of sourced modules for inclusion in the release currently being developed. Thus, if the provider determines that a patch, update, or upgrade of a sourced module is required, introduction of the patch, update, or upgrade of a sourced module may impact the delivery of the current release, and even subsequent releases depending on the impact of the patch, update, or upgrade to the development cycle.

Furthermore, in addition to the concerns of providers with respect to development costs and development cycles, the rapid evolution, and hazardous nature, of computer security threats makes it even more important for providers to perform due diligence with respect to patches, updates, and upgrades of sourced software modules, in order to ensure that security fixes, stability fixes, and other bug fixes are appropriately considered. Moreover, providers face increasing commercial risks associated with software applications, e.g., when a software application is shipped to a customer and that software application is subsequently attacked via a previously-known security flaw that had been patched in an updated version of the sourced module that was available and could reasonably have been included by the system/solution provider in the shipped system/solution.

SUMMARY OF THE INVENTION

Various deficiencies in the prior art are addressed through the invention of a method for assessing an available version of a sourced element. The method includes obtaining a description of an available version of the sourced element, identifying a plurality of evaluation items for the sourced element by evaluating the description using at least one evaluation category including a plurality of evaluation parameters, and determining an overall assessment of the available version of the sourced element using the identified evaluation items for the sourced element. The overall assessment is indicative of a value associated with the available version of the sourced element. The method may further include generating overall assessments of other available versions of a sourced element or generating overall assessments of available versions of other sourced elements, and prioritizing the available versions of the sourced elements using the overall assessments of the available versions of the sourced elements.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a sourced element assessment capability for assessing an available version of a sourced element. The present invention may perform the sourced element assessment for multiple available versions of one sourced element, and prioritize the available versions of the sourced element using respective overall assessments of the available versions of the sourced element. The present invention may perform the sourced element assessment for multiple sourced elements, and prioritize the available versions of the sourced elements using respective overall assessments of the available versions of the sourced elements.

The overall assessments of available versions of sourced elements may be used to quantify and prioritize the importance of upgrading from the current versions of sourced elements to the available versions of the sourced elements (or risk of upgrading, benefit of upgrading, and the like, as well as various other measures, as depicted and described herein). The overall assessments of available versions of sourced elements, as well as the associated prioritization of available versions of sourced elements, may, therefore, be used in order to determine whether to upgrade from a current version of a sourced element to an available version of the sourced element.

As described herein, the sourced element assessment capabilities of the present invention may be provided in numerous different contexts. In one embodiment, the sourced element assessment capabilities of the present invention may be implemented as an in-house development tool (e.g., for system/solution development companies and the like). In one embodiment, the sourced element assessment capabilities of the present invention may be implemented as a network-based sourced element assessment service. For example, software/firmware companies may use the present invention to provide a service that enables users to quickly determine whether a new version of a sourced element is available and to decide if/when to upgrade to the new version. The service may be requested by users or pushed to users by the companies. Although primarily depicted and described with respect to specific implementations, the present invention may be utilized in various other implementations.

Figure 1:
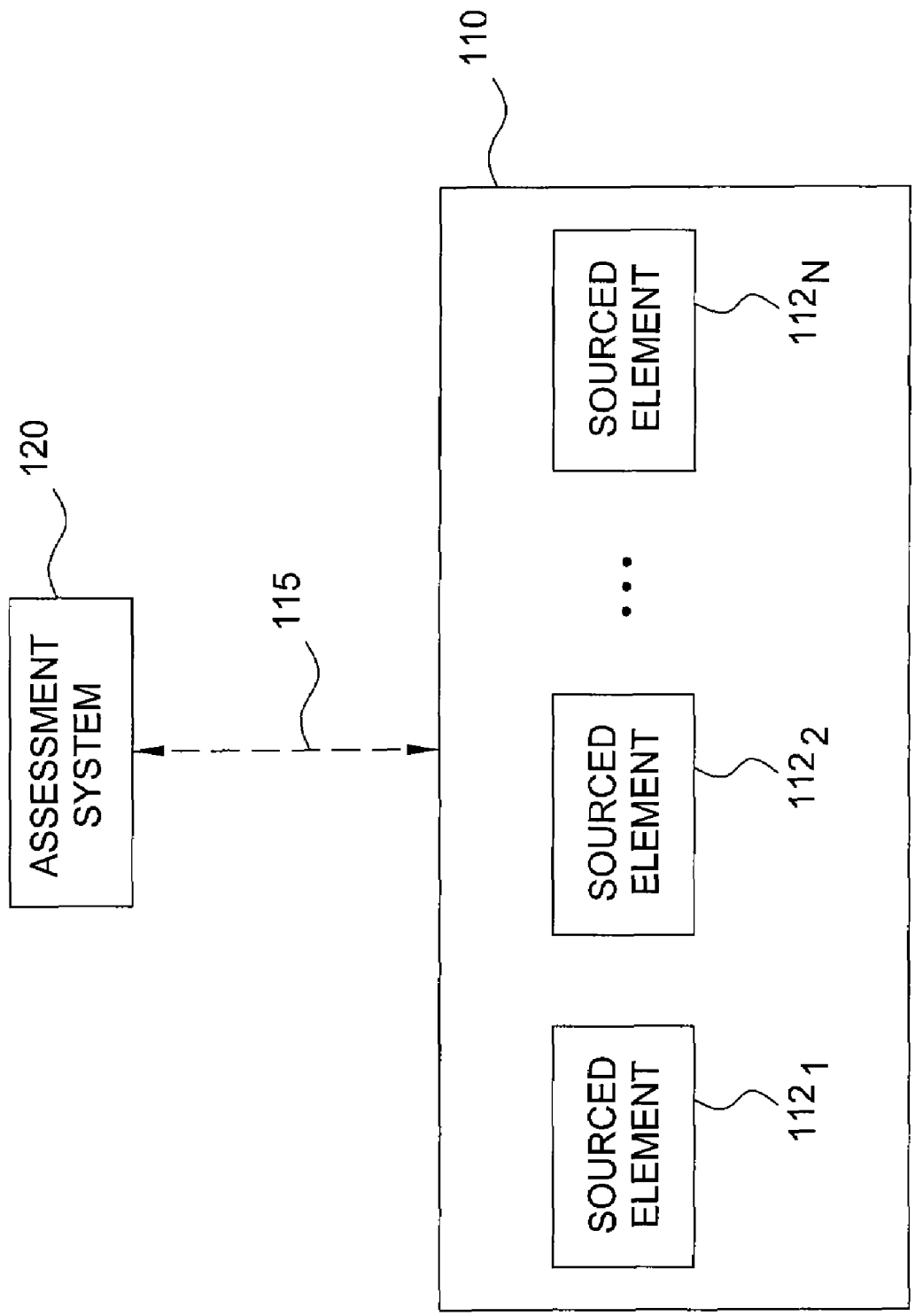
FIG. 1 depicts a high-level block diagram of a system including a product having sourced elements and an assessment system for generating an assessment of sourced elements.

FIG. 1 depicts a high-level block diagram of a system including a product and an assessment system. The product includes sourced elements, which, as described herein, may include sourced software elements, sourced firmware elements, sourced hardware elements, and the like, as well as various combinations thereof. The assessment system is adapted for generating assessments of different versions of sourced elements of the product, as well as prioritizing different versions of sourced elements of the product according to the generated assessments of the different versions of the sourced elements of the product. Specifically, system 100 includes a product 110 and an assessment system (AS) 120.

The product 110 is any product including at least one element (denoted herein as a sourced element) adapted for being assessed in accordance with the present invention. For example, product 110 may be a telecommunication product (e.g., a network element such as a server, a router, a switch, a base station, a line card, and the like, a network operations system such as a network management system, a provisioning system, a fault management system, and the like), a consumer product (e.g., a desktop computer, a laptop computer, a wireline phone, a wireless phone, a cable settop box, a personal data assistant, a music player, and the like), and the like, as well as various combinations thereof. Although primarily depicted and described herein with respect to a product, the present invention may be used for evaluating sourced elements of a portion of a device or product (e.g., one or more specific components), systems, solutions, and the like, as well as various combinations thereof.

As depicted in FIG. 1, product 110 includes a plurality of elements; specifically, a plurality of sourced elements (SEs) $112_1$-$112_N$ (collectively, SEs 112). The SEs 112 include elements adapted for being assessed in accordance with the present invention, as depicted and described herein. For example, SEs 112 may include hardware elements (e.g., processors, controllers, and the like, as well as various combinations thereof), firmware elements (e.g., software embedded in a hardware device, such as computer programs embedded in a read-only memory (ROM) integrated circuit, an erasable programmable read-only memory (EPROM) chip including a program adapted for being modified by external hardware, and the like, as well as various combinations thereof), software elements (e.g., system software, application software, and the like, as well as various combinations thereof), and the like, as well as various combinations thereof.

The AS 120 includes a computer adapted for performing sourced element assessment functions of the present invention. In one embodiment, AS 120 does not communicate with product 110 for performing sourced element assessment functions (e.g., all information required for performing sourced element assessments is available locally from AS 120, or from other systems and databases). In one embodiment, AS 120 does communicate with product 110 for performing sourced element assessment functions (e.g., for determining sourced elements and current versions of sourced elements of product 110, for transmitting sourced element upgrades to product 110, and the like). In one embodiment, as depicted in FIG. 1, AS 120 and product 110 may communicate using a communication path 115, which may include a direct link between AS 120 and product 110, an indirect link between AS 120 and product 110 via a private network or a public network (as depicted and described herein with respect to FIG. 6 and FIG. 7, respectively), and the like, as well as various combinations thereof.

The present invention is primarily depicted and described herein with respect to embodiments in which SEs 112 are sourced software elements (e.g., open source software modules included in application software). As described herein, during application software development many software development organizations utilize sourced software modules (rather than developing all software modules in-house); however, there is increased development cost associated with integrating sourced software modules with the application software being developed. The present invention enables software development organizations to assess newly-available sourced software modules (i.e., patched/updated/upgraded modules). Furthermore, the present invention may be extended to provide a network-based sourced software module assessment service to companies and end-users.

Figure 2:
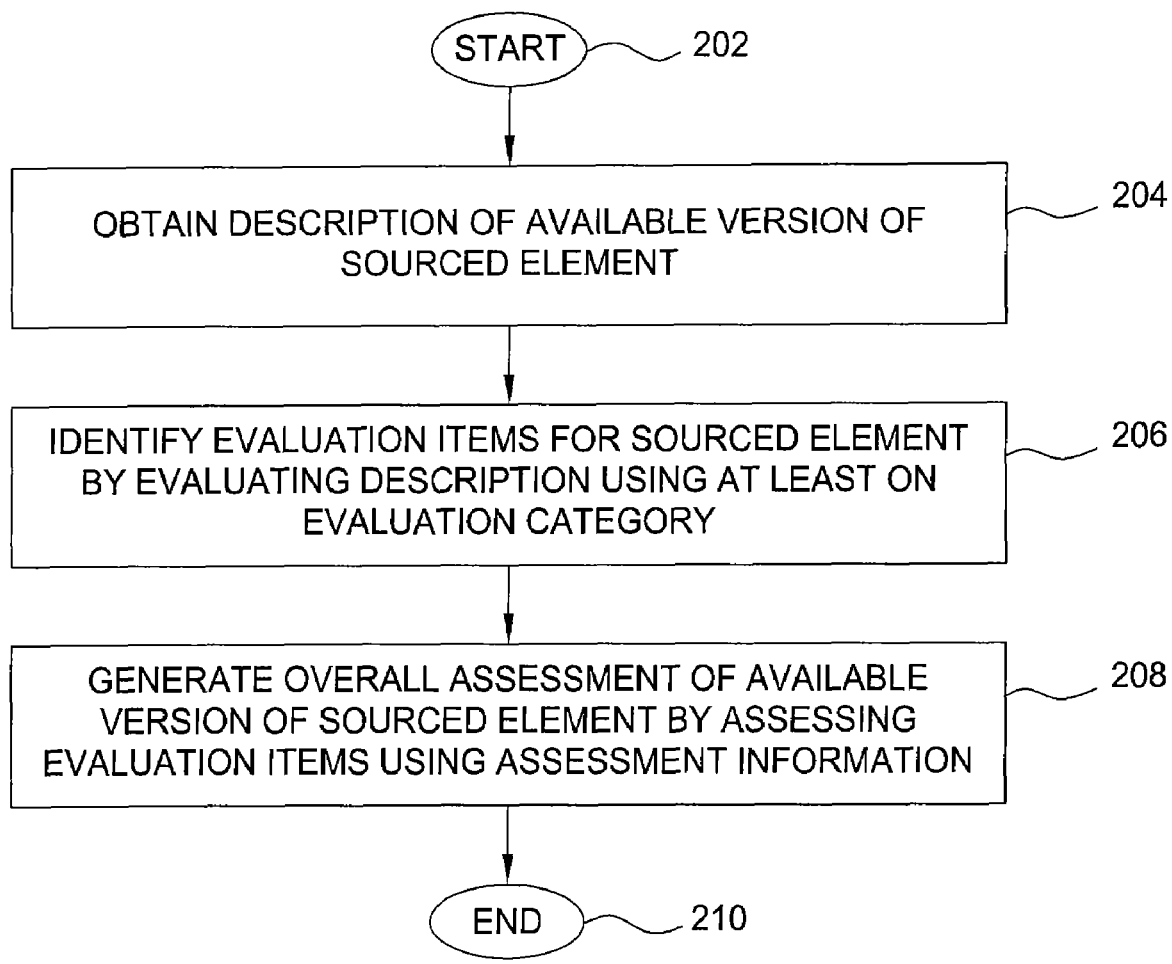
FIG. 2 depicts a method according to one embodiment of the present invention.

FIG. 2 depicts a method according to one embodiment of the present invention. Specifically, method 200 of FIG. 2 includes a method for generating an overall assessment of an available version of a sourced element. As described herein, the overall assessment of the sourced element may be used for determining whether to upgrade to the available version of the sourced element, and may be used for comparing the available version of the sourced element to available versions of other sourced elements. Although depicted and described as being performed serially, at least a portion of the steps of method 200 of FIG. 2 may be performed contemporaneously, or in a different order than depicted in FIG. 2. The method 200 begins at step 202 and proceeds to step 204.

At step 204, a description of an available version of a sourced element (also referred to herein as a sourced element available version description) is obtained. The sourced element available version description may be pre-generated or generated on-the-fly. The sourced element available version description is generated using at least one description input. The source(s) of the information of which the sourced element available version description is composed, the information of which the sourced element available version description is composed, and the format of the sourced element available version description may each vary depending on the sourced element type, i.e., depending on whether the sourced element is a sourced software element, a sourced firmware element, or a sourced hardware element.

At step 206, evaluation items for the sourced element are identified. The evaluation items for the sourced element are identified by evaluating the sourced element available version description using at least one evaluation category. In one embodiment, evaluation categories may include a security category, a reliability category (and/or a stability category, depending on the sourced element type), a performance category, a compatibility category, and the like. In one embodiment, an evaluation category has one or more associated evaluation parameters. In one such embodiment, at least a portion of the evaluation parameters of an evaluation category may include one or more keywords.

In one embodiment, each evaluation item may belong to an item category (also referred to as an item type). In one embodiment, item categories may correspond to the evaluation categories. For example, item categories may include a security category, a reliability category (and/or a stability category, depending on the sourced element type), a performance category, a compatibility category, and the like. In one embodiment, item categories may include categories unrelated to the evaluation categories, categories which operate as a combination of some of the evaluation categories, and the like, as well as various combinations thereof. For example, items categories may include a risk category, an issue category, a cost category, an improvement category, and the like.

At step 208, an overall assessment of the available version of the sourced element is generated. The overall assessment of the available version of the sourced element is generated by assessing the evaluation items using assessment information. In one embodiment, evaluation information may include at least one of: assessment parameters, product information, business information, and the like, as well as various combinations thereof. At step 210, method 200 ends. The sourced element description, evaluation categories, evaluation parameters, evaluation items, assessment information, and overall assessment depicted and described with respect to FIG. 2 may be better understood with respect to FIG. 3. The method 200 of FIG. 2 may be better understood with respect to embodiments depicted and described herein with respect to FIG. 4-FIG. 6.

Although primarily depicted and described herein with respect to generating an overall assessment of one available version of a sourced element, method 200 may be repeated for a plurality of available versions of a sourced element. For example, where multiple versions of a sourced element (e.g., Microsoft WINDOWS XP service pack and Microsoft WINDOWS VISTA) have been released since the version currently installed in the product, overall assessments of each of the available versions of the sourced element may be generated and prioritized (e.g., using a cost/benefit analysis or some other way of quantifying this, as depicted and described herein) in a manner enabling a determination as to which (if any) of the available versions of the sourced element should be installed.

Although primarily depicted and described herein with respect to generating an overall assessment of one available version of one sourced element, method 200 may be repeated for a plurality of sourced elements of a product. For example, where new versions of multiple sourced elements (e.g., Microsoft WINDOWS service pack and Mozilla FIREFOX service pack) have been released, overall assessments of the available versions of the sourced elements may be generated and prioritized (e.g., using a cost/benefit analysis or some other way of quantifying this, as depicted and described herein) in a manner enabling a determination as to which (if any) of the sourced element should be upgraded by installing the available version.

Figure 3:
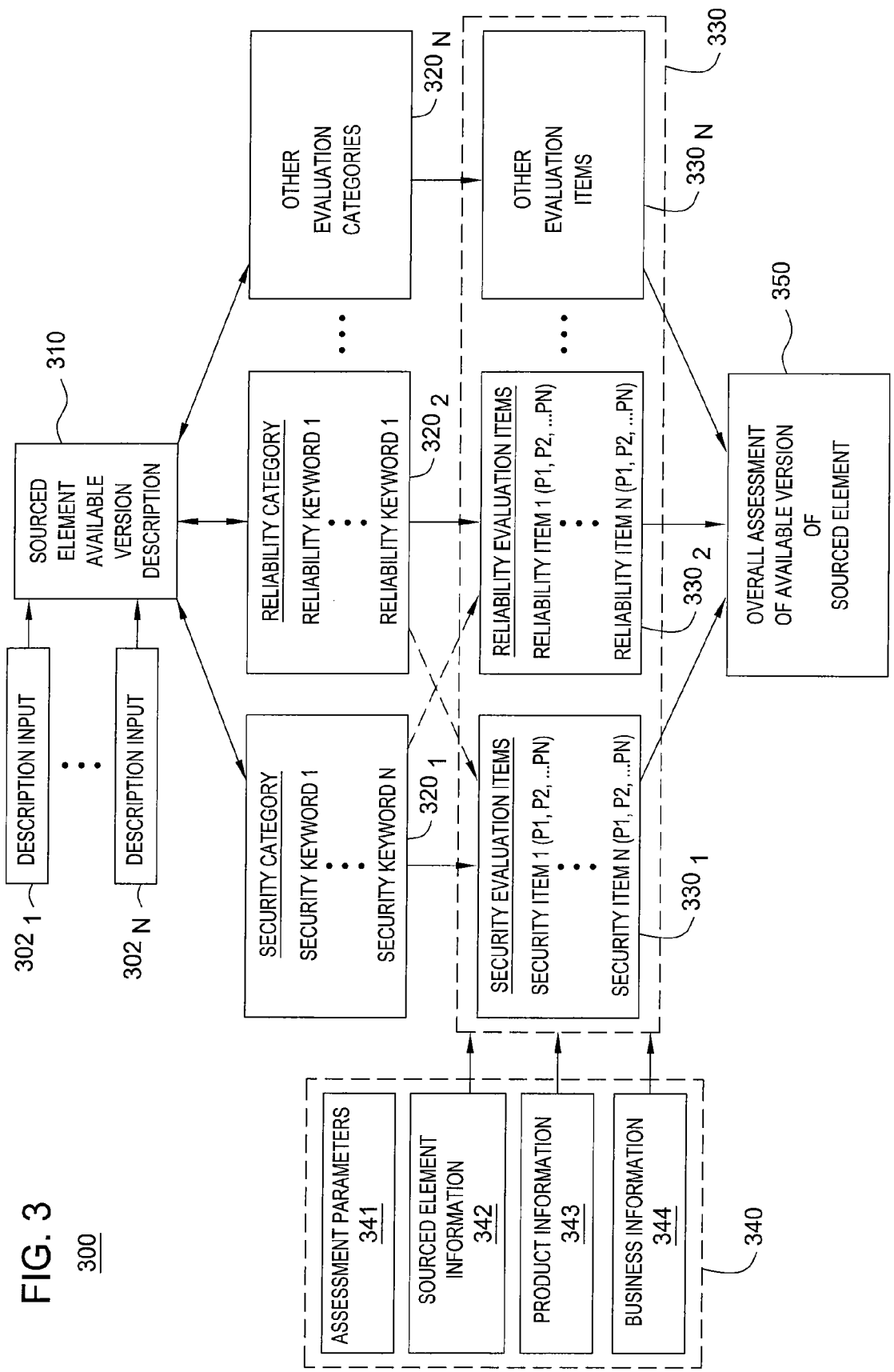
FIG. 3 depicts associations between each of the outputs of methods according to different embodiments of the present invention.

FIG. 3 depicts a high-level block diagram of a process of generating an overall assessment of an available version of a sourced element. As depicted in FIG. 3, process 300 depicts an embodiment of a process of generating an overall assessment of an available version of a sourced element within the context of inputs to the process and outputs from the process, as well as associations and interactions between such inputs/outputs of the process. Although, for purposes of clarity, primarily depicted and described herein with respect to a sourced software element, process 300 of FIG. 3 may be adapted for assessing other sourced element types, e.g., sourced firmware elements, sourced hardware elements, and the like.

As depicted in FIG. 3, a description of an available version of a sourced element (illustratively, sourced element available version description 310) is generated using a plurality of description inputs $302_1$-$302_N$ (collectively, description inputs 302). Although primarily depicted and described with respect to a process for assessing one available version of one sourced element, as described herein multiple versions of a sourced element may be assessed, and multiple sourced elements may be assessed. In such embodiments, each of the available versions of the sourced element(s) would be assessed using sourced element available version descriptions associated with that available version of the sourced element.

In one embodiment, the sourced element available version description 310 may be pre-generated (e.g., prior to the time at which the process to generate the overall assessment of the available version of the sourced element is executed). In one embodiment, the sourced element available version description 310 may be generated on-the-fly (e.g., at the time at which the process to generate the overall assessment of the available version of the sourced element is executed). In one embodiment, a portion of the sourced element available version description 310 may be pre-generated, and this pre-generated portion of the sourced element available version description may be supplemented with additional description information on-the-fly, such that the most up-to-date sourced element available version description information is used for generating the assessment of the available version of the sourced element.

The description inputs 302 may include any information that describes the available version of the sourced element. The description inputs 302 may include any information relevant to one or more of the evaluation categories, e.g., security information, reliability information, performance information, compatibility information, and the like, as well as various combinations thereof. For example, for a sourced software element, description inputs 302 may include release notes, "Read-Me" files, change logs, bug-fix lists, history files, and the like, as well as various combinations thereof. The description inputs 302 may be obtained from various sources (as depicted and described herein with respect to FIG. 6 and FIG. 7).

In one embodiment, description inputs 302 may be obtained from a database associated with the assessment system. In one embodiment, the database may be updated periodically to include description inputs 302 (e.g., the assessment system may periodically initiate requests to various companies and organizations for description inputs for newly-available versions of sourced elements, various companies and organizations may periodically push description inputs for newly-available versions of sourced elements to the assessment system, and the like). In one embodiment, the database may be updated in include description inputs 302 in response to newly-available versions of sourced elements becoming available (e.g., the assessment system initiates a request for description inputs in response to a notification from a company or organization that the newly-available version of the sourced element is available, a company or organization pushes description inputs for a sourced element when the newly-available version of the sourced element becomes available, and the like).

In one embodiment, description inputs 302 may be obtained from one or more systems maintained by a company or organization which provides a sourced element. For example, for a sourced software element developed and provided by a particular company, description inputs 302 associated with the available version of the sourced element for which the overall assessment is being generated may be retrieved by the assessment system from one or more servers maintained by that particular company. For example, the company may maintain a server including documentation associated with different releases of the sourced element (e.g., Release Notes files, bug-fix lists, release description documents, and the like for each release of each sourced element) which may be retrieved by the assessment system in order to perform the assessment of a particular version of the sourced element.

The description inputs 302 may have any format, although structured data is preferred since such data is easier to process and search. In one embodiment, at least a portion of description inputs 302 may be preprocessed. The description inputs 302 may be preprocessed to change the respective formats of description inputs 302 (e.g., to standardize the information included within description inputs 302). The description inputs 302 may be preprocessed to remove irrelevant information. In one embodiment, the irrelevant information is information that is irrelevant within the context of any of the evaluation categories. In one embodiment, irrelevant information is information that is irrelevant within the context of only those evaluation categories used to generate the assessment of the available version of the sourced element.

The sourced element available version description 310 is generated from the description inputs 302. In one embodiment, sourced element available version description 310 is an association of the individual description inputs 302 (i.e., the contents of the description inputs are not actually combined, but, rather, are linked so as to be associated with the available version of the sourced element). In one embodiment, sourced element available version description 310 is a combination of description inputs 302 (i.e., description inputs 302 are processed to form a single sourced element available version description 310).

As depicted in FIG. 3, sourced element available version description 310 is processed using at least one of a plurality of evaluation categories $320_1$-$320_N$ (collectively, evaluation categories 320). As depicted in FIG. 3, sourced element available version description 310 is processed using a security evaluation category $320_1$ and a reliability evaluation category $320_2$, and may be processed using other evaluation categories denoted as other evaluation categories $320_N$ (e.g., a performance evaluation category, a compatibility evaluation category, and the like).

As depicted in FIG. 3, each evaluation category 320 includes a plurality of evaluation parameters. In one embodiment, at least a portion of the evaluation parameters of an evaluation category may be keywords associated with the evaluation category. For example, security evaluation category $320_1$ includes security-related keywords (denoted as security keywords 1 through N) and reliability evaluation category $320_2$ includes reliability-related keywords (denoted as reliability keywords 1 through N). Similarly, other evaluation categories $320_N$ include respective evaluation parameters (e.g., performance evaluation category includes performance-related evaluation parameters, compatibility evaluation category includes compatibility-related evaluation parameters, and the like). Although primarily depicted and described herein with respect to evaluation parameters being keywords, each evaluation category may include various other evaluation parameters.

For example, keywords may include words such as: security, secure, insecure, authorization, authorized, password, vulnerability, vulnerable, reliability, reliable, unreliable, leak, memory leak, resource leak, exhaust, stack exhaust, memory exhaust, out of memory, crash, fail, failure, failing, failover, fault, virus, worm, Trojan horse, infect, attack, destroy, loss, clobber, break, breaks, breakage, broken, destruction, public, privilege, privileged, privacy, confidential, confidentiality, corrupt, data integrity, data trashing, junk data, garbage value, overwrite, overwritten, overwrote, buffer, robust, robustness, protection, safety, infinite loop, recursive state, continuously, looping, recursive loop, die, died, dead, fatal, zombie, core dump, hang, hangs, hung, lock, deadlock, abort, aborts, shutdown, connection closed, connection closing, overflow, prevent, disable, block, blocking, reject, hijack, hijacking, repudiation, rerouting, masquerade, session replay, denial of service, DoS, and the like, as well as various combinations thereof.

The keywords may vary by evaluation category. It should be noted that each of these keywords and associated variations thereof, as well as various other keywords, may each be associated with one or more of the evaluation categories. The keywords may vary by product type (e.g., messaging system versus cable modem), product vendor, sourced element type, and the like, as well as various combinations thereof. Although primarily described with respect to full words, partial word searches may also be performed. For example, a keyword search may be performed using "fail*" to capture any keywords beginning with "fail", such as fail, fails, failure, failures, failover, and the like. Furthermore, various other keyword searching techniques may be applied within the context of the present invention.

As depicted in FIG. 3, sourced element available version description 310 is processed using evaluation categories $320_1$-$320_N$ in order to identify pluralities of evaluation items $330_1$-$330_N$ (collectively, evaluation items 330), respectively. Specifically, sourced element available version description 310 is processed using security category $320_1$ to identify security evaluation items $330_1$, sourced element available version description 310 is processed using reliability category $320_2$ to identify reliability evaluation items $330_2$, and sourced element available version description 310 is processed using other evaluation categories $320_N$ (e.g., a performance category, a compatibility category, and the like) to identify other evaluation items $330_N$.

The security evaluation items $330_1$ include a plurality of security items (denoted as security items 1 through N). The reliability evaluation items $330_2$ include a plurality of reliability items (denoted as reliability items 1 through N). The security evaluation items $330_1$, reliability evaluation items $330_2$, and other evaluation items 330N may be collectively referred to as evaluation items 330. As described herein, evaluation items 330 may be categorized according to at least one evaluation item category. As described herein, evaluation item categories may include a security category, a reliability category (and/or a stability category), a performance category, a compatibility category, and the like.

In one embodiment, each evaluation item 330 includes one or more evaluation parameters. The evaluation parameters of an evaluation item may specify different characteristics of the evaluation item. In one embodiment, evaluation parameters may include at least one of the evaluation category (or categories) with which the evaluation item is associated, an evaluation item type (e.g., a cost item, a benefit item, an issue item, an improvement item, and the like), a description of the evaluation item (or even multiple different descriptions of the evaluation item or multiple parameters describing different characteristics of the evaluation item), a probability associated with the evaluation item, and like parameters adapted for further defining evaluation items, as well as various combinations thereof.

For example, where evaluation items include evaluation item type parameters, security item 1 may be an improvement item describing a potential security improvement associated with the available version of the sourced element, security item 2 may be a cost item describing a cost associated with implementing the available version of the sourced element to correct the security item, reliability item 1 may be a risk item describing a potential reliability risk associated with the available version of the sourced element, reliability item 1 may be a benefit item describing a potential benefit to the reliability of the sourced element by upgrading from the current version of the sourced element to the available version of the sourced element, and so on.

Although primarily depicted and described herein with respect to using keyword searches on sourced element available version description 310 in order to identify evaluation items 330, as information (including description inputs 302 and, therefore, sourced element available version description 310) becomes more standardized; more intelligent forms of data processing may be used to identify evaluation items 330 from sourced element available version description 310. For example, description inputs 302 and, therefore, sourced element available version description 310 may be specified using a structured format, such as Extensible Mark-Up Language (XML), thereby enabling more intelligent processing of sourced element available version description 310 in order to identify evaluation items 330 from sourced element available version description 310.

As depicted in FIG. 3, evaluation items 330 are assessed using assessment information 340 in order to generate an overall assessment of the available version of the sourced element 350 (referred to herein as overall assessment 350). In one embodiment, overall assessment 350 may be generated by assessing evaluation items 330 using assessment information 340 using one or more algorithms. The assessment information 340 used to generate overall assessment 350 includes as least one of: assessment parameters 341, sourced element information 342, product information 343, and business information 344. Although primarily depicted and described with respect to specific assessment information such as assessment parameters 341, sourced element information 342, product information 343, and business information 344, other information may be used in assessing evaluation 330 (e.g., technical information, product development information, and the like, as well as various combinations thereof).

In one embodiment, overall assessment 350 may be determined by counting numbers of evaluation items having different evaluation items types. For example, assume one hundred twenty-four evaluation items have been identified for an available version of a sourced element. In this example, assume that of the one hundred twenty-four evaluation items, forty-six items are risk items and seventy-eight items are improvement items. In this example, since the number of improvement items is much greater than the number or risk items, the overall assessment of the available version of the sourced element would be such that upgrade of the sourced element from the current to the available version is recommended.

In one embodiment, overall assessment 350 may be determined by prioritizing the evaluation items 330. In one embodiment, for example, evaluation items may prioritized according to a probability associated with each of the evaluation items 330. In one such embodiment, for example, the evaluation items 330 may then be evaluated according to an evaluation item category associated with each of the evaluation items 330 (e.g., security category, a reliability category and/or a stability category, a performance category, a compatibility category, and the like, as well as any other categories that may be of interest, such as improvement, risk, issue, cost, and the like, as well as various combinations thereof).

The assessment parameters 341 may include any parameters adapted for assessing, quantifying, and understanding evaluation items 330. In one embodiment, at least a portion of assessment parameters 341 may include thresholds that may be used in order to identify evaluation items that address any critical or major security, reliability/stability, performance, interoperability, or like issues addressed in the available version of the sourced element. The thresholds may be associated with numbers of evaluation items, probabilities of evaluation items or other parameters associated with evaluation items, and the like, as well as various combinations thereof. In one embodiment, at least a portion of assessment parameters 341 may include various other metrics, descriptors, and the like, as well as various combinations thereof.

The sourced element information 342 may include any information associated with the sourced element being assessed. The sourced element information 342 may include technical information associated with the sourced element being assessed. The sourced element information 342 may include technical information associated with other sourced elements, including other sourced elements with which that sourced element interacts. For example, the sourced element information may include technical information such as one or more features or functions provided by the sourced element, how the sourced element is implemented to provide those features/functions, and the like, as well as various combinations thereof.

The sourced element information 342 may also include historical information associated with the sourced element. In one embodiment, the historical information may include information such as sourced element release history, sourced element bug-fix history, historical metrics associated with the sourced element (e.g., performance metrics, reliability metrics, and the like, as well as various combinations thereof), and like metrics, as well as various combinations thereof. The sourced element information 342 may be a repository of sourced element information for numerous different sourced elements which may be assessed by the assessment system, or which may be used in assessing one or more other sourced elements.

The product information 343 may include any information associated with a product with which the sourced element being assessed is associated. The product information 343 may include technical information associated with the product. In one embodiment, technical information includes product design information and product operability information which may include information about how a sourced element operates, how a sourced element is applied within and used within the product, inter-dependencies between sourced elements within the product, and like information, as well as various combinations thereof.

The product information 343 may also include historical information associated with the product. In one embodiment, the historical information may include information such as product release history, product bug-fix history, historical metrics associated with the product (e.g., performance metrics, reliability metrics, and like metrics, as well as various combinations thereof), and the like, as well as various combinations thereof. The product information 343 may include version compatibility information. The product information 343 may include any other information associated with the product with which the sourced element being assessed is associated.

The business information 344 may include any business information that may be used in assessing available versions of sourced elements. For example, the business information may include information indicative of recurring and/or non-recurring engineering, development, integration, testing, and like expenses for integrating available versions of sourced elements into the product, cost-of-goods-sold (COGS) implications of using the available versions of different sourced elements versus continuing to use the current versions of different sourced elements, and the like, as well as various combinations thereof.

In one example of this embodiment, assume that four evaluation items have been identified for an available version of a sourced element, including two risk items (where the probability of the risk items occurring is 80% and 70%, respectively) and two improvement items (where the probability of occurrence of improvements identified by the improvement items is 30% and 15%, respectively). In this example, assuming that the evaluation items are ranked by probability, the two risk items would be given the highest weight while the two improvement items would be given the lowest weight. In this example, further processing of the prioritized items would indicate that the available version of the sourced element has a high probability of exposing the sourced element to additional risks and a low probability of improving to the sourced element and, thus, the overall assessment of the available version of the sourced element would be such that upgrade of the sourced element from the current to the available version is not recommended.

The overall assessment 350 indicates a value associated with the available version of the sourced element. In one embodiment, the value may quantify one or more different measures which may be used in order to determine whether or not to upgrade from a current version of a sourced element to an available version of the sourced element. The measures may correspond to reasons for (or against) upgrading from a current version to an available version of a sourced element (and/or reasons for or against not upgrading from a current version to an available version of a sourced element. For example, the different reasons (which may be quantified by the measures) may include benefits, risks, costs, issues, and the like, as well as various combinations thereof, of upgrading (and/or not upgrading) from the current version of the sourced element to the available version of the sourced element.

In one embodiment, the value conveyed by overall assessment 350 may be indicative of one or more less-quantifiable characteristics of the available version of a sourced element (or of upgrading from the current version of the sourced element to the available version of the sourced element). For example, the value conveyed by overall assessment 350 may indicate an importance of upgrading (or not upgrading) from the current version to the available version of the sourced element, an impact of upgrading (or not upgrading) from the current version to the available version of the sourced element, and the like as well as various combinations thereof.

For example, value associated with an available version of the sourced element may be indicative of various combinations of reasons and associated measures (e.g., the available version of the sourced element solves x number of security problems and provides y number of value-added features for z cost, the available version of the sourced element provides x new features with 0 impact to sourced element reliability/stability, the available version of the sourced element provides x number of value-added features for the cost of reducing performance by 5%, the importance of upgrading to the available version of the sourced element is 81 out of 100, and the like, as well as various combinations thereof).

Furthermore, although described with respect to specific measures, reasons, and the like, it should be noted that overall assessment 350 may include any other information, including information adapted for quantifying the available version of a sourced element, quantifying differences between current and available versions of a sourced element and between multiple available versions of a sourced element, prioritizing available versions of one or more sourced elements, performing additional analysis (e.g., development planning, business planning, and the like), and the like, as well as various combinations thereof.

In one embodiment, for example, overall assessment 350 may include counts of the numbers of evaluation items 330 in each of the evaluation categories. In one such embodiment, the counts of the number of evaluation items in each of the evaluation categories may be further subdivided into various other categories (e.g., the number of low, medium, and high impact evaluation items 330 in each of the evaluation categories). In one such embodiment, low impact evaluation items may be evaluation items having a small limited impact to the operation of the sourced element, medium impact evaluation items may be evaluation items requiring a restart of the sourced element, and high impact evaluation items may be evaluation items that may impact other source elements and components of the product.

The overall assessment 350 may be represented using any means of quantifying the overall assessment of the available version of the sourced element. In one embodiment, for example, overall assessment 350 may be represented using a numeric score (e.g., a score in a range from 0 to 100, a score in a range from 1 to 5, and the like). In another embodiment, for example, overall assessment 350 may be represented using a letter score (e.g., a score in a range from A-F, a score in the range from A to K, and the like). In general, overall assessment 350 may be represented using any means of quantifying the overall assessment of the available version of the sourced element.

In another embodiment, for example, in which a raw score is determined for the available version of the sourced element, the raw score may be mapped to one or more assessment classifications which may be used to represent the overall assessment. For example, in one embodiment, in which a raw score in the range 1 to 5 is determined, a raw score of 1.0 to 1.9 may be mapped to an overall assessment classification of DO NOT UPGRADE, a raw score of 2.0 to 2.9 may be mapped to an overall assessment classification of UPGRADE NOT RECOMMENDED, a raw score of 2.0 to 2.9 may be mapped to an overall assessment classification of UPGRADE RECOMMENDED, a raw score of 3.0 to 3.9 may be mapped to an overall assessment classification of UPGRADE HIGHLY RECOMMENDED, and a raw score of 4.0 to 5.0 may be mapped to an overall assessment classification of UPGRADE CRITICAL.

Although primarily depicted and described herein with respect to various scores, raw scores, classifications, and the like, those skilled in the art will appreciate that overall assessment 350 for an available version of a sourced element may be represented using any numbers, letters, scores, words, recommendations, and the like, as well as various combinations thereof. Although primarily depicted and described herein with respect to specific measures that overall assessment 350 for an available version of a sourced element is intended to quantify, those skilled in the art will appreciate that that overall assessment 350 for an available version of a sourced element may quantify various other measures.

Figure 4:
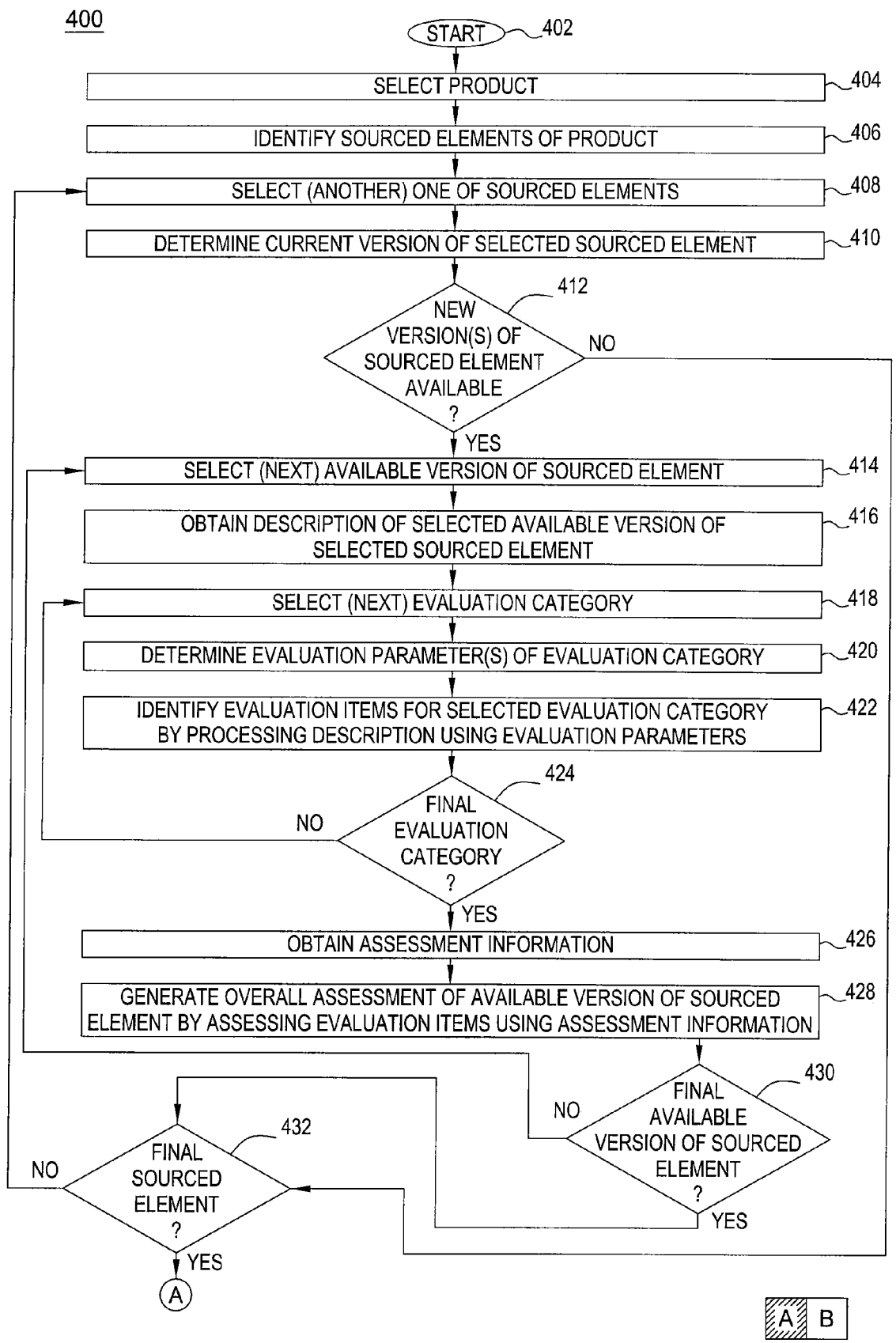
FIG. 4 depicts a method according to one embodiment of the present invention.
Figure 4:
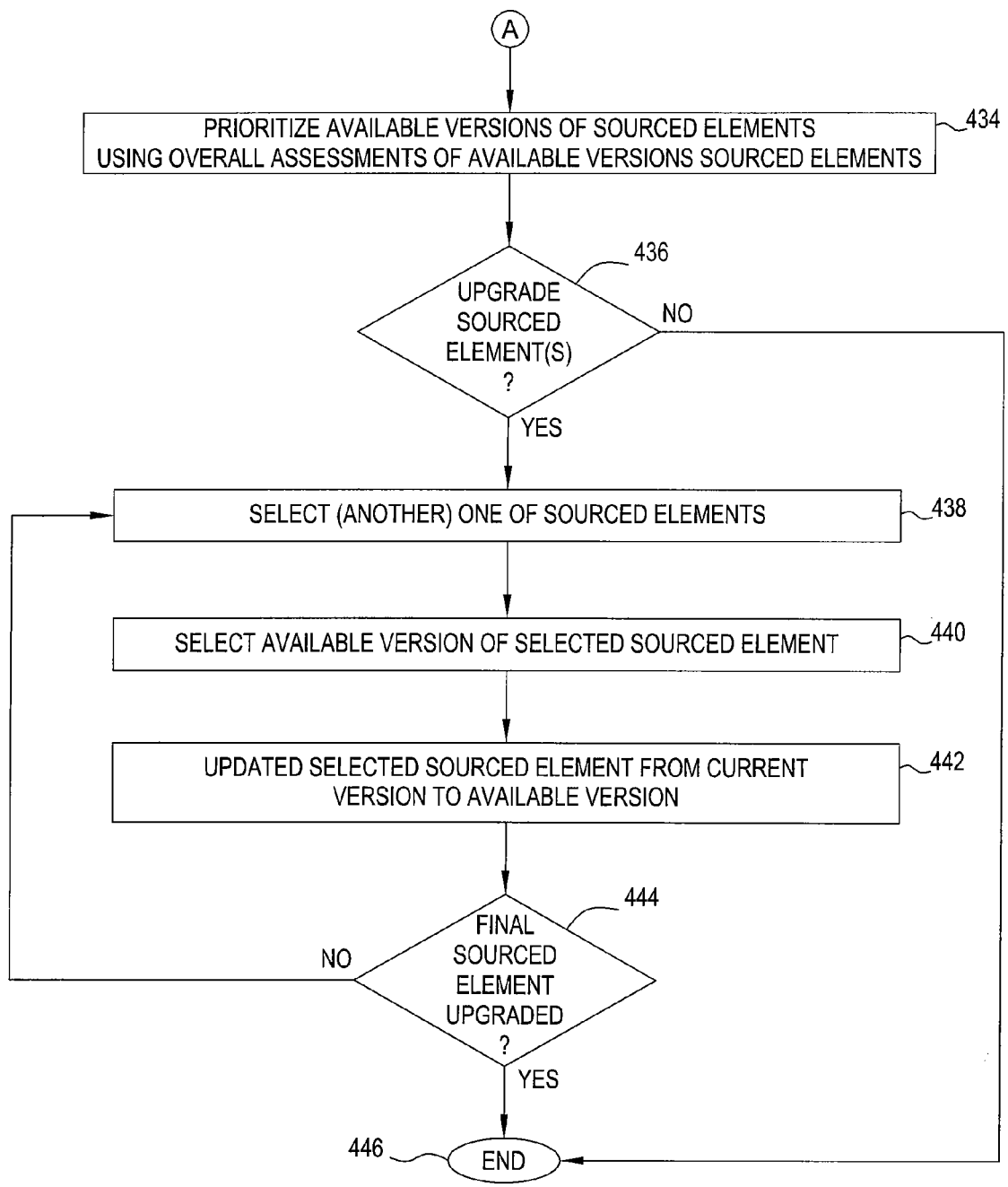

FIG. 4 depicts a method according to one embodiment of the present invention. Specifically, method 400 of FIG. 4 includes a method for generating overall assessments of available versions of sourced elements and prioritizing the available versions of the sourced elements using the overall assessments of the available versions of the sourced elements. Although depicted and described as being performed serially, at least a portion of the steps of method 400 of FIG. 4 may be performed contemporaneously, or in a different order than depicted in FIG. 4. The method 400 begins at step 402 and proceeds to step 404.

At step 404, a product is selected. At step 406, sourced elements associated with the product (i.e., sourced elements currently installed within the product) are identified. In one embodiment, all sourced elements of the product are identified. In one embodiment, a portion of the sourced elements of the product are identified. In one such embodiment, identification of the sourced elements may be performed according to one or more scope criteria. The selection of a subset of the sourced elements of a product using scope criteria may be better understood with respect to FIG. 5.

In one embodiment, sourced elements associated with a product may be determined using sourced element information. The sourced element information may include a list of sourced elements included within the product. In one embodiment, the list of sourced elements may include information associated with each of the sourced elements, such as the name of the supplier of the sourced element (which may also include the type of supplier, e.g., whether the sourced element is a commercial/purchased element or an open-source/non-purchased element, and the like), the name of the sourced element, the version of the sourced element (including version information such as release number, build number, patch number, and the like), and like information, as well as various combinations thereof.

In one embodiment, sourced element information associated with a product may be determined by querying the product. In one embodiment, sourced element information associated with a product may be determined using one or more systems and/or databases (local to the assessment system or remote from the assessment system). In one embodiment, the assessment system (or one or more databases associated with the assessment system) may be updated with sourced element information. In one embodiment, the assessment system may retrieve the sourced element information from one or more systems and/or databases of product suppliers, software suppliers, and the like, as well as various combinations thereof. The use of such local and remote systems and databases is described in additional detail herein with respect to FIG. 6 and FIG. 7.

At step 408, one of the identified sourced elements is selected. At step 410, the current version of the sourced element (i.e., version of the sourced element currently installed in the product) is determined. At step 412, a determination is made as to whether a new version (or versions, since multiple versions of the sourced element may have been released since the current version of the sourced element was installed) of the selected sourced element is available. If a new version of the selected sourced element is not available, method 400 proceeds to step 428, at which point a determination is made as to whether the selected sourced element is the final sourced element (e.g., the final sourced element in the product, the final sourced element in scope for assessment using the present invention, and the like). If a new version (or versions) of the selected sourced element is available, method 400 proceeds to step 414.

At step 414, an available version of the sourced element is selected. If only one available version of the sourced element has been identified, that available version of the sourced element is selected. At step 416, a description of the selected available version of the sourced element (referred to herein as a sourced element available version description) is obtained. The sourced element available version description, as well as various sources from which and ways in which the sourced element available version description may be obtained, is depicted and described herein with respect to FIG. 3).

At step 418, an evaluation category is selected. The selected evaluation category may include one of a security category, a reliability category, a performance category, a compatibility category, and the like. The evaluation categories may be better understood with respect to FIG. 3. At step 420, evaluation parameters associated with selected evaluation category are determined. At step 422, evaluation items are identified by processing the sourced element available version description using the evaluation parameters of the selected evaluation category. As described herein, in one embodiment, in which the evaluation parameters of the selected evaluation category include keywords, evaluation items may be identified by searching the sourced element available version description using the keywords.

At step 424, a determination is made as to whether the selected evaluation category is the final evaluation category (e.g., the final evaluation category available for selection, the final evaluation category designated for use in generating an overall assessment of the available version of the sourced element, and the like). If the selected evaluation category is not the final evaluation category, method 400 returns to step 418, at which point the next evaluation category is selected. If the selected evaluation category is the final evaluation category, method 400 proceeds to step 426.

At step 426, assessment information is obtained. The assessment information is adapted for use in assessing the evaluation items. The assessment information may include assessment parameters, product information, business information, and the like, as well as various combinations thereof. At step 428, an overall assessment of the selected available version of the sourced element is generated by assessing the evaluation items using the assessment information. The overall assessment of the available version of the sourced element may be better understood with respect to FIG. 3.

At step 430, a determination is made as to whether the selected available version of the sourced element is the final available version of the sourced element. If the selected available version of the sourced element is not the final available version of the sourced element, method 400 returns to step 414, at which point the next available version of the sourced element is selected to be assessed. If the selected available version of the sourced element is the final available version of the sourced element, method 400 proceeds to step 432.

As described herein, in some cases, only one version of a sourced element may have been released since the current version of the sourced element was installed in the product. In such cases, only one loop of steps 414-428 is required. In other cases, multiple (and sometimes even many) different versions of a sourced element may have been released since the current version of the sourced element was installed in the product. In such cases, multiple loops of steps 414-428 are required (one loop for each available version of the sourced element.

At step 432, a determination is made as to whether the selected sourced element is the final sourced element (e.g., the final sourced element associated with the product, the final sourced element included within the scope of assessment processing for the product, and the like). If the selected sourced element is not the final sourced element, method 400 returns to step 408, at which point another one of the sourced elements is selected. If the selected sourced element is the final sourced element, method 400 proceeds to step 434.

At step 434, the available versions of the sourced elements are prioritized using the overall assessments of the respective available versions of the sourced elements, forming thereby a prioritized list of the available versions of the sourced elements (although, in some embodiments, sourced elements without a newly-available version to assess may be included in the list for completeness). At step 436, a determination is made as to whether any of the sourced elements is upgraded. In one embodiment, the determination as to whether any of the sourced elements is upgraded is made using the prioritized list of the available versions of the sourced elements. If none of the sourced elements is selected to be upgraded, method 400 proceeds to step 446, where method 400 ends. If any of the sourced elements is selected to be upgraded, method 400 proceeds to step 438.

At step 438, one of the sourced elements is selected. In one embodiment, selection of the sourced element is performed using the prioritized list of the available versions of the sourced elements (e.g., the sourced element associated with the available version of the soured element having the highest priority is selected first, and so on). At step 440, an available version of the selected sourced element is selected. In one embodiment, only one available version may be available for selection; however, where multiple available versions of the sourced element were assessed, one of the available versions is selected as the version to which the sourced element is to be upgraded. In one embodiment, selection of the available version to which the sourced element is upgraded is performed using a prioritized list of the available versions of the sourced element.

Figure 6:
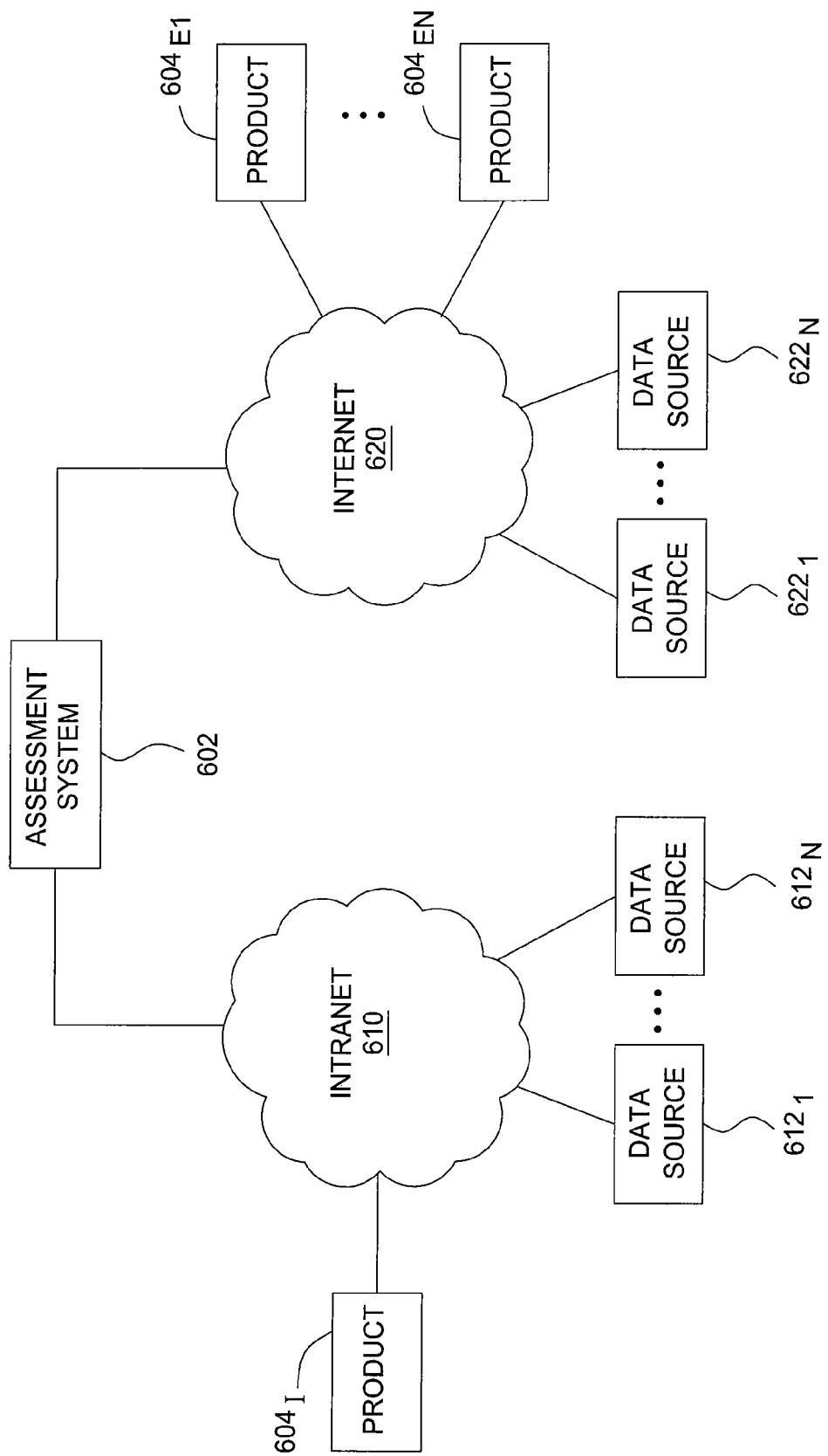
FIG. 6 depicts a network architecture according to one embodiment of the present invention.
Figure 7:
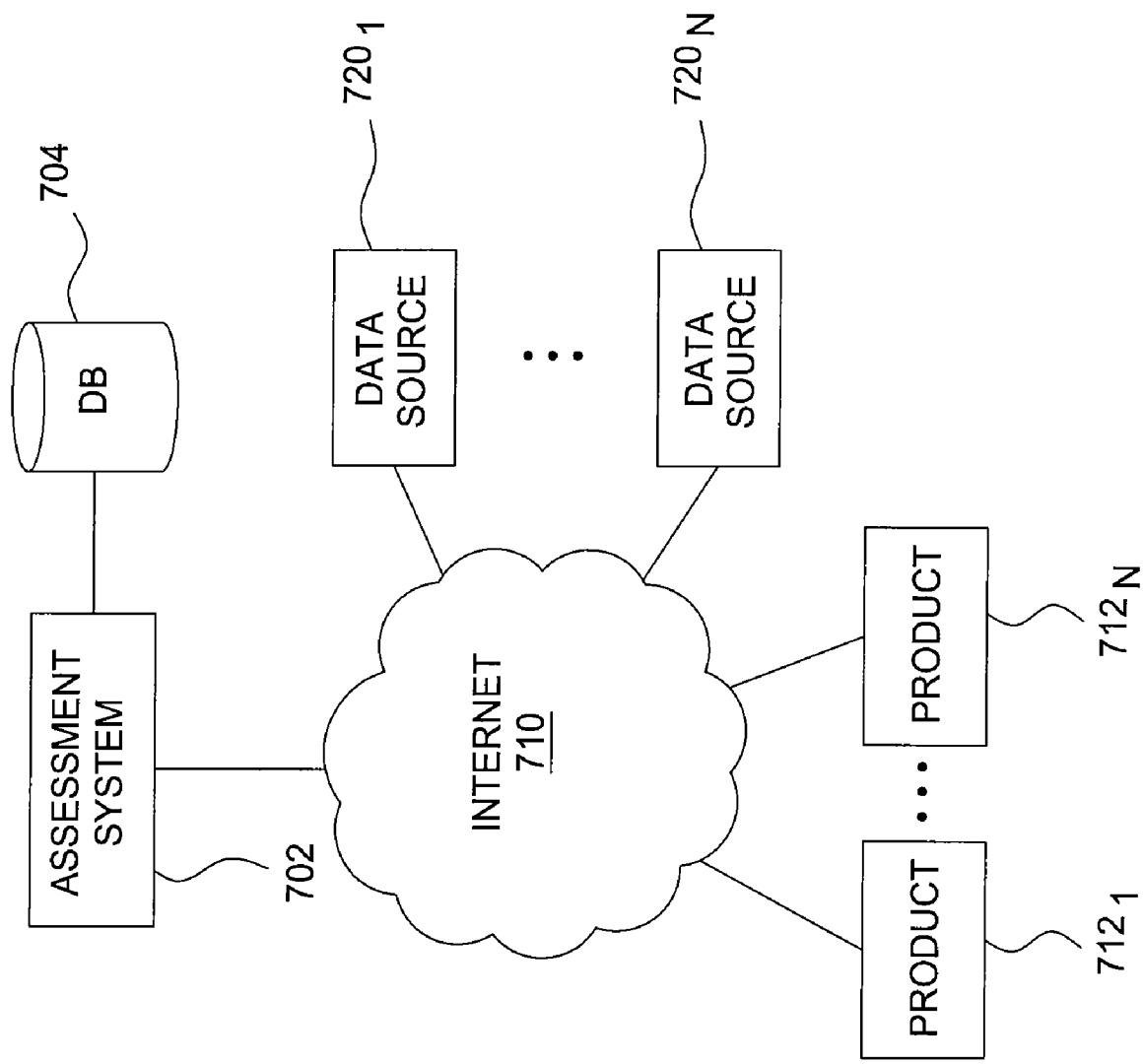
FIG. 7 depicts a network architecture according to one embodiment of the present invention.

At step 442, the selected sourced element is upgraded from the current version of the sourced element to the available version of the sourced element (i.e., to the available version of the sourced element selected in step 440). The various processes by which the sourced element may be upgraded are depicted and described herein with respect to FIG. 6 and FIG. 7, although FIG. 6 and FIG. 7 are not intended to be limiting of the ways by which a sourced element may be upgraded. At step 444, a determination is made as to whether the final sourced element has been upgraded. If the final sourced element has not been upgraded, method 400 returns to step 438, at which point another one of the sourced elements is selected to be upgraded. If the final sourced element has been upgraded, method 400 proceeds to step 446, where method 400 ends.

Although primarily depicted and described herein with respect to an embodiment in which one or more sourced elements is upgraded following completion of sourced element assessment processing, in other embodiments upgrades of sourced elements may be postponed (i.e., not performed in conjunction with the sourced element assessment processing). For example, sourced elements identified as requiring upgrades from current versions to available versions, respectively, may not actually be upgraded until software development (and other associated activities, such as integration, testing, and the like) begins on a future release of the product/system.

Although primarily depicted and described herein with respect to embodiments in which the overall assessments of sourced elements are utilized immediately for determining which sourced elements are upgraded following completion of sourced element assessment processing, in other embodiments the overall assessments of sourced elements may be stored for later use in performing various other functions. In such embodiments, overall assessments of sourced elements may be used as inputs for other analysis processes, planning processes, and the like, as well as various combinations thereof. For example, overall assessments of sourced element may be used to perform product/system development planning for future releases, business analysis processes (e.g., cost-of-goods-sold (COGS) analysis), and the like, as well as various combinations thereof.

Figure 5:
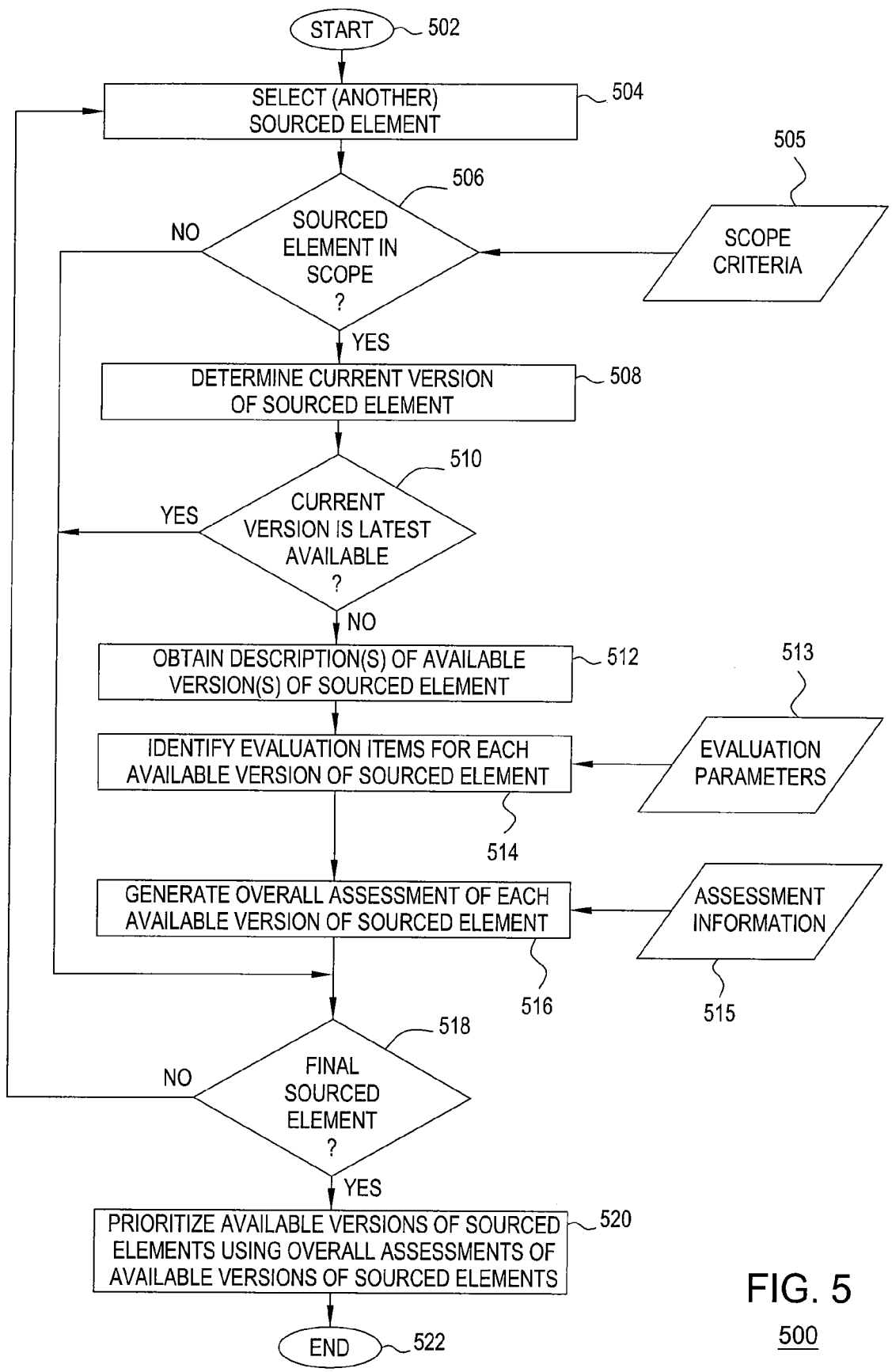
FIG. 5 depicts a method according to one embodiment of the present invention.

FIG. 5 depicts a method according to one embodiment of the present invention. Specifically, method 500 of FIG. 5 includes a method for generating overall assessments of available versions of sourced elements and prioritizing the available versions of the sourced elements using the overall assessments of the available versions of the sourced elements. Although depicted and described as being performed serially, at least a portion of the steps of method 500 of FIG. 5 may be performed contemporaneously, or in a different order than depicted in FIG. 5. The method 500 begins at step 502 and proceeds to step 504.

At step 504, a sourced element is selected. At step 506, a determination is made as to whether or not the selected sourced element is in scope for being assessed. The determination is made as to whether or not the selected sourced element is in scope for being assessed is performed using scope criteria 505. If the selected sourced element is not in scope for being assessed, method 500 proceeds to step 518, at which point a determination is made as to whether the final sourced element has been selected. If the selected sourced element is in scope for being assessed, method 500 proceeds to step 508.

At step 508, the current version of the selected sourced element is determined. In one embodiment, the current version of the selected sourced element is determined from a version identifier. The version identifier may vary depending on the sourced element type, depending on which company or organization developed the sourced element, and like factors. For example, the version identifier may be a release number, a patch number, a version number, and the like, as well as various combinations thereof.

At step 510, a determination is made as to whether or not the current version of the selected sourced element is the latest available version of the selected sourced element. If the current version of the selected sourced element is the latest available version of the selected sourced element, method 500 proceeds to step 518, at which point a determination is made as to whether the final sourced element has been selected (i.e., there is no need to evaluate the latest available version of the selected sourced element). If the current version of the selected sourced element is not the latest available version of the selected sourced element, method 500 proceeds to step 512.

At step 512, a description of the each available version of the sourced element (referred to herein as sourced element available version descriptions) is obtained. As described herein, one or more versions of a sourced element may be available (i.e., multiple versions of the sourced element may have become available since the current version of the sourced element was installed). The sourced element available version description, as well as various sources from which and ways in which the sourced element available version description may be obtained, is depicted and described herein with respect to FIG. 3.

At step 514, evaluation items are identified for each available version of the sourced element. The evaluation items for an available version of a sourced element are determined by processing the sourced element available version description for that available version of the sourced element. The evaluation items are identified by processing the sourced element available version description using evaluation parameters 513 (which may be associated with one or more evaluation categories). In one embodiment, evaluation parameters 513 are predetermined. In one embodiment, evaluation parameters 513 are determined on-the-fly. In one embodiment, in which evaluation parameters 513 include keywords, evaluation items may be identified by searching the sourced element available version description using the keywords.

At step 516, an overall assessment is generated for each available version of the sourced element. The overall assessment of an available version of a sourced element is generated using the evaluation items for that available version of the sourced element. The overall assessment of the available version of the sourced element is generated by processing the evaluation items using assessment information 515. The assessment information 515 may include at least one of assessment parameters, product information, business information, and the like, as well as various combinations thereof. In one embodiment, at least a portion of the assessment information is predetermined. In one embodiment, at least a portion of the assessment information is determined on-the-fly. The overall assessment of the available version of the sourced element may be better understood with respect to FIG. 3.

At step 518, a determination is made as to whether the final sourced element has been selected. If the final sourced element has not been selected, method 500 returns to step 504, at which point another sourced element is selected. If the final sourced element has been selected, method 500 proceeds to step 520. At step 520, the available versions of the sourced elements are prioritized using the overall assessments of the respective available versions of the sourced elements. As described herein, the prioritized list of the available versions of the sourced elements may be used for various purposes (e.g., upgrade planning, migration planning, and the like, as well as various combinations thereof). At step 522, method 500 ends.

FIG. 6 depicts a network architecture according to one embodiment of the present invention. Specifically, network architecture 600 of FIG. 6 includes an assessment system (AS) 602, an internal product (IP) $604_I$, and a plurality of external products (EPs) $604_{E1}$-$604_{EN}$ (collectively, EPs $604_E$) The AS 602 is adapted for performing various functions depicted and described herein, including identifying sourced elements associated with IP $604_I$ and EPs $604_E$, identifying evaluation items for sourced elements associated with IP $604_I$ and EPs $604_E$, generating overall assessments for sourced elements associated with IP $604_I$ and EPs $604_E$, and the like, as well as various combinations thereof.

As depicted in FIG. 6, AS 602 is coupled to an intranet 610 (which may be any private communication network) by which AS 602 communicates with IP $604_I$ and a plurality of data sources (DSs) $612_1$-$612_N$ (collectively, DSs 612). In one embodiment, AS 602 is coupled to intranet 610 such that AS 602 can perform assessments of sourced elements of various products being developed by the company operating AS 602, such as IP $604_I$. In one embodiment, AS 602 is coupled to intranet 610 such that AS 602 can obtain information adapted for performing assessments of sourced element of various products (illustratively, EPs $604_E$) external to the company operating AS 602 (e.g., to provide sourced element assessment services to other companies developing products in-house, to end-users (e.g., for computers, phones, cable boxes, and like end-customer devices), and the like, as well as various combinations thereof).

The AS 602 may communicate with IP $604_I$ for retrieving information associated with IP $604_I$ that is adapted for use in determining overall assessments of sourced elements of IP $604_I$ (e.g., for retrieving a list of sourced elements currently used within IP $604_I$, current version information associated with sourced elements currently used within IP $604_I$, and the like, as well as various combinations thereof). The AS 602 may communicate with DSs 612 for retrieving information adapted for use in determining overall assessments of available versions of sourced elements of IP $604_I$ (and, optionally, for EPs $604_E$ where the company operating AS 602 is providing a sourced element evaluation service to outside companies and end-users).

The DSs 612 may be any data sources storing information adapted for use in determining overall assessments of available versions of sourced elements. For example, DSs 612 may include systems, databases, and the like, as well as various combinations thereof. For example, DSs 612 may include systems such as release tracking systems, modification request (MR) tracking systems, defect tracking systems, and like systems having information adapted for use in determining overall assessments of available versions of sourced elements of IP $604_I$ (and, optionally, EP $604_E$). For example, DSs 612 may include databases such as descriptions databases, product information databases, technical information databases, business information databases, and the like, as well as various combinations thereof.

For example, a description database may include sourced element available version descriptions and other description information associated with different versions of sourced elements. For example, a technical information database may include any technical information which may be used as part of the assessment information by which evaluation items are assessed in accordance with various embodiments of the present invention. For example, a product information database may include information associated with different products such as IP $604_I$, EPs $604_E$, and other internal and external products which may be useful in assessing products such as IP $604_I$, EPs $604_E$, and which may be used as part of the assessment information by which evaluation items are assessed in accordance with various embodiments of the present invention. For example, a business information database may include business information used as part of the assessment information by which evaluation items are assessed in accordance with various embodiments of the present invention.

The AS 602 may communicate with IP $604_I$ for providing sourced element upgrades to IP $604_I$ (e.g., downloading the latest version of sourced software to IP $604_I$, downloading the latest version of sourced firmware to IP $604_I$, and the like, as well as various combinations thereof) for upgrading IP 6041 from a current version to an available version. In one embodiment, AS 602 may provide sourced element upgrades to IP $604_I$ directly. In one embodiment, AS 602 may direct one or more other systems (e.g., DSs 612, DSs 622 (e.g., via a communication path between intranet 610 and Internet 620), and the like, as well as various combinations thereof) to provide sourced element upgrades to IP 604$_I$.

As depicted in FIG. 6, AS 602 is coupled to Internet 620 (which may be any public communication network) by which AS 602 may communicate with EPs 604$_E$ and a plurality of data sources (DSs) 622$_1$-622$_N$ (collectively, DSs 622). In one embodiment, AS 602 is coupled to Internet 620 such that AS 602 can obtain information adapted for performing assessments of available versions of sourced elements of products being developed by the company operating AS 602 (such as IP 604$_I$). In one embodiment, AS 602 is coupled to Internet 620 such that AS 602 can perform assessments of available versions of sourced elements of products external to the company operating AS 602 (illustratively, EPs 604$_E$).

For example, AS 602 may be coupled to Internet 620 in order to obtain information from DSs 622 that may be used for performing assessments of available versions of sourced elements of products being developed by the company operating AS 602. For example, AS 602 may be coupled to Internet 620 in order to perform assessments of available versions of sourced elements of one or more of the following: products developed by the company operating AS 602 and sold to other companies (e.g., to provide remote product maintenance support), products being developed by other companies, products owned by end-users (e.g., for computers, phones, cable boxes, and like end-customer devices), and the like, as well as various combinations thereof.

The AS 602 may communicate with EP 604$_E$ for retrieving information associated with EP 604$_E$ adapted for use in determining overall assessments of sourced elements of EP 604$_E$ (e.g., for retrieving a list of sourced elements currently used within EP 604$_E$, current version information associated with sourced elements currently used within EP 604$_E$, and the like, as well as various combinations thereof, as described herein with respect to various embodiments). The AS 602 may communicate with DSs 622 for retrieving information adapted for use in determining overall assessments of sourced elements of EP 604$_E$ (and, optionally, for IP 604$_I$ where the company operating AS 602 is performing sourced element evaluation for products developed in-house).

The DSs 612 may be any data sources storing information adapted for use in determining overall assessments of available versions of sourced elements. For example, DSs 612 may include systems, databases, and the like, as well as various combinations thereof. For example, DSs 622 may include servers and other systems storing information such as sourced element available version descriptions, product information, and the like. For example, DSs 622 may include servers maintained by companies operating websites that provide sourced element support, e.g., websites providing description documentation associated with different releases of sourced elements (e.g., release notes files, readme files, and the like, as well as various combinations thereof). Similarly, for example, DSs 622 may include databases maintained by companies that provide sourced elements and associated sourced element support, companies that provide products and associated product support, and the like.

The AS 602 may communicate with EP 604$_E$ for providing sourced element upgrades to EP 604$_E$ (e.g., downloading the latest version of sourced software to EP 604$_E$, downloading the latest version of sourced firmware to EP 604$_E$, and the like, as well as various combinations thereof). A network architecture adapted for providing sourced element upgrade services to end-users (e.g., to computers, cable set-top boxes, cable modems, wireline phones, wireless phones, personal digital assistants (PDAs), music players, and the like, as well as various combinations thereof) is depicted and described herein with respect to FIG. 7. A method for providing sourced element upgrade services to end-users is depicted and described herein with respect to FIG. 8.

Although depicted and described with respect to a network architecture in which separate Intranet and Internet networks make specific information available to AS 602, various other network architectures may be used by AS 602 to retrieve information that is adapted for use in determining overall assessments of available versions of sourced elements. For example, as administrative boundaries change, at least a portion of information depicted and described herein as being available via Intranet 610 may be available via Internet 620 and, similarly, at least a portion of information depicted and described herein as being available via Internet 620 may be available via Intranet 610. Thus, network architecture 600 of FIG. 6 is merely an exemplary network architecture and is not limiting with respect to where information may be obtained.

FIG. 7 depicts a network architecture according to one embodiment of the present invention. Specifically, network architecture 700 of FIG. 7 includes an assessment system (AS) 702, an assessment system database (ASDB) 704, Internet 710 (or any other communication network), a plurality of products 721$_1$-721$_N$ (collectively, products 721), and a plurality of data sources (DSs) 720$_1$-720$_N$ (collectively, DSs 720). In one embodiment, AS 702, Internet 710, and DSs 720 may operate in a manner similar to AS 602, Internet 620, and DSs 622 depicted and described herein with respect to FIG. 6.

In one embodiment, ASDB 704 may store any information adapted for use by AS 702 in determining overall assessments of available versions of sourced elements of products 712. In one embodiment, ASDB may store information similar to information available to AS 602 from DSs 612 and DSs 622, as depicted and described herein with respect to FIG. 6. For example, AS 702 pay periodically query various systems and databases in order to populate ASDB 704 with information adapted for use by AS 702 in determining overall assessments of available versions of sourced elements of products 712 (e.g., sourced element version information, sourced element available version description information, assessment information, and the like, as well as various combinations thereof.

As described herein, AS 702 may perform remote assessments of sourced elements of products 712. For example, products 712 may include end-customer devices such as computers, cable set-top boxes and modems, wireline and wireless phones, televisions, personal digital assistants (PDAs), music players, and the like, as well as various combinations thereof. In other words, in one embodiment, the present invention may be provided as a network-based service in which end-users may request an assessment (illustratively, by AS 702 using information from ASDB 704 and systems 720) of a particular product (illustratively, products 712). A method according to one such embodiment is depicted and described herein with respect to FIG. 8.

Figure 8:
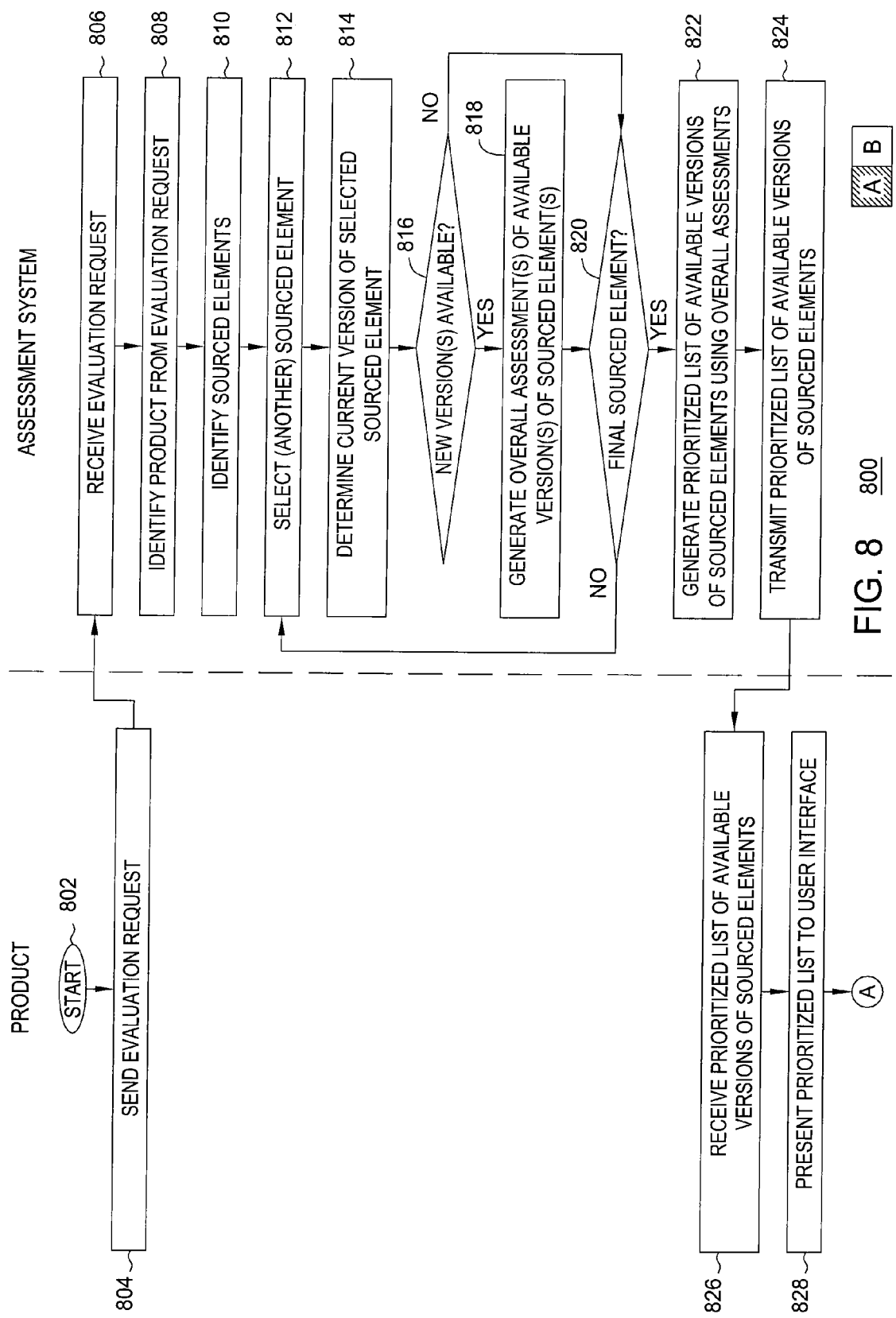
FIG. 8 depicts a method according to one embodiment of the present invention.
Figure 8:
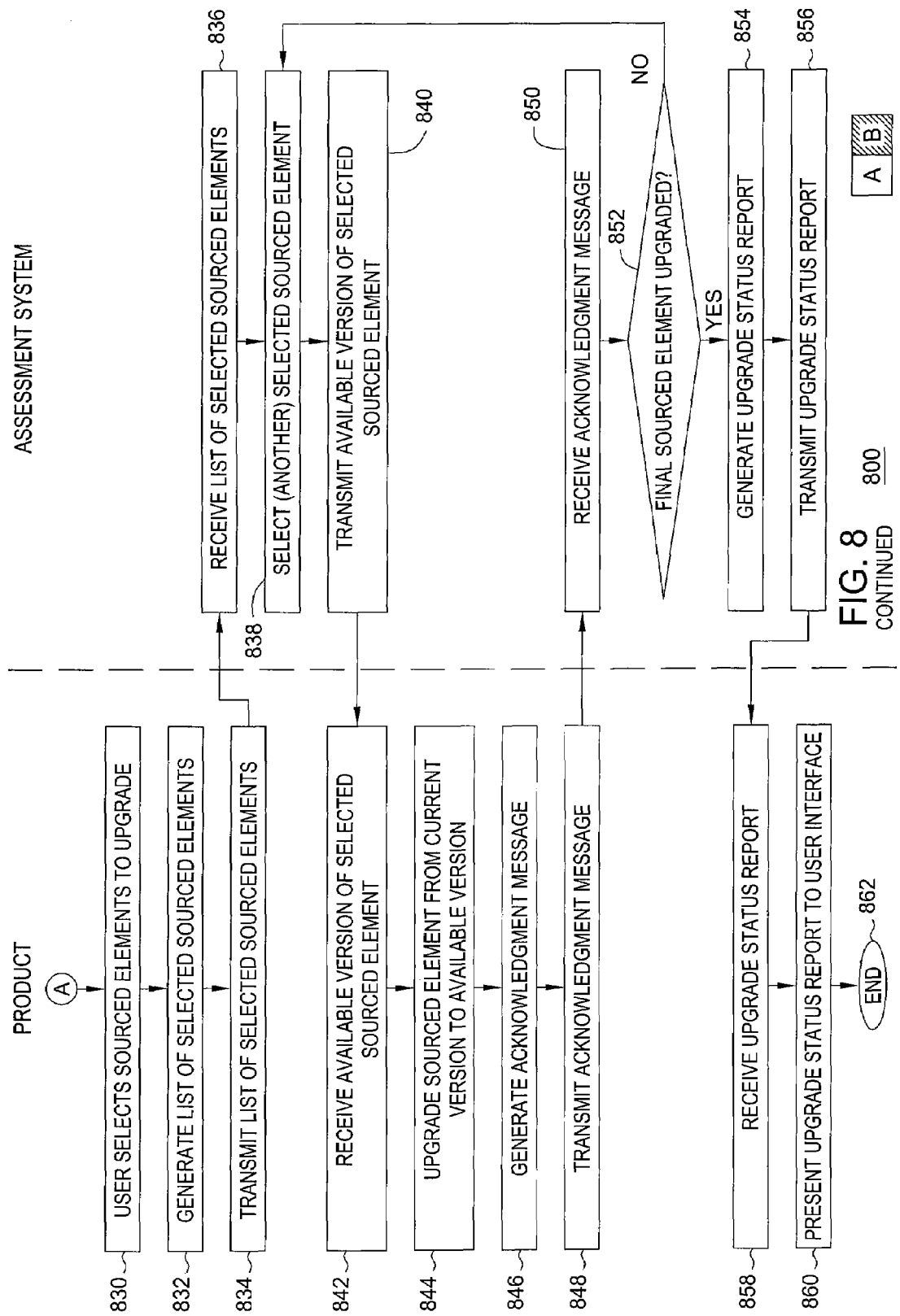

FIG. 8 depicts a method according to one embodiment of the present invention. Specifically, method 800 of FIG. 8 includes a method for providing a network-based product assessment service whereby an assessment system performs an assessment of one or more sourced elements of a product in response to a request initiated by an end-customer associated with the product. Although depicted and described as being performed serially, at least a portion of the steps of method 800 of FIG. 8 may be performed contemporaneously, or in a different order than depicted in FIG. 8. The method 800 begins at step 802 and proceeds to step 804.

At step 804, a user device (illustratively, one of the products 712) sends an evaluation request to an assessment system (illustratively, AS 702). In one embodiment, the evaluation request is initiated by a user associated with the user device. At step 806, the assessment system receives the evaluation request from the user device. At step 808, the assessment system identifies the product from the evaluation request. The product may be the end-user device or another device associated with the end-user device from which the evaluation request is generated and sent to the assessment system.

At step 810, the assessment system identifies sourced elements of the product. In one embodiment, the sourced elements of the product are identified from the evaluation request. In one embodiment, the sourced elements of the product are identified from a database associated with the assessment system (illustratively, ASDB 704). In one embodiment, the sourced elements of the product are identified by initiating a query from the assessment system to the product identified in the evaluation request (omitted from method 800 of FIG. 8 for purposes of clarity).

At step 812, the assessment system selects one of the identified sourced elements. At step 814, the assessment system determines the current version of the selected sourced element. The current version of the selected sourced element may be determined from the evaluation request, from a database associated with the assessment system (illustratively, ASDB 704), by initiating a query from the assessment system to the product identified in the evaluation request, and the like, as well as various combinations thereof.

At step 816, the assessment system makes a determination as to whether a new version of the selected sourced element is available (i.e., as to whether or not the current version of the sourced element is the most recent version of the sourced element). If a new version of the selected sourced element is not available, method 800 proceeds to step 820. If a new version of the selected sourced element is available, method 800 proceeds to step 818. At step 818, the assessment system generates an overall assessment of an available version (i.e., the latest version) of the sourced element. The overall assessment of the available version of the sourced element may be generated as described herein.

At step 820, the assessment system makes a determination as to whether the selected sourced element is the final sourced element (e.g., the final sourced element in the product, the final sourced element in scope for assessment using the present invention, and the like). If the selected sourced element is not the final sourced element, method 800 returns to step 812, at which point the assessment system selects another sourced element. If the selected sourced element is the final sourced element, method 800 proceeds to step 822.

At step 822, the assessment system generates a prioritized list of the available versions of the sourced elements (e.g., a prioritized list of all available versions of respective sourced elements for which an overall assessment was generated in step 818, although, in some embodiments, sourced elements without a newly-available version to assess may be included in the prioritized list for completeness). The prioritized list of the available versions of the sourced elements is generated using the overall assessments of the respective available versions of the sourced elements.

At step 824, the assessment system transmits the prioritized list of the available versions of the sourced elements from the assessment system to the user device (i.e., the user device from which the evaluation request was initiated). At step 826, the user device receives the prioritized list of the available versions of the sourced elements from the assessment system. At step 828, the user device presents the prioritized list of the available versions of the sourced elements to a user interface of the user device such that the user of the user device may review the prioritized list of the available versions of the sourced elements.

In one embodiment, the prioritized list of the available versions of the sourced elements may be presented in a manner such that the user is provided with one or more recommendations (e.g., this set of upgrades is critical, this set of upgrades would be nice to have but is not critical, and the like, as well as various combinations thereof). The prioritized list of the available versions of the sourced elements may also include cost information associated with performing the respective upgrades to the available versions of the respective sourced elements. The prioritized list of available versions of the sourced elements may be presented along with other information adapted for use by the user in determining which sourced elements to upgrade.

At step 830, the user of the user device selects sourced elements to upgrade. The user may specify selections of sourced elements to upgrade using any means of selection via the user interface (e.g., checkboxes, link selection, and the like). At step 832, the user device generates a list of the selected sourced elements (selected by the user via a user interface at the user device). At step 834, the user device transmits the list of the selected sourced elements to the assessment system. At step 836, the assessment system receives the list of the selected sourced elements from the user device.

At step 838, the assessment system selects one of the selected sourced elements (from the list of the selected sourced elements transmitted to the assessment system). At step 840, the assessment system transmits the available version of the selected sourced element (i.e., the sourced element selected by the assessment system) to the user device in order to upgrade the selected sourced element from the current version to the available version. Although primarily depicted and described with respect to an embodiment in which the available version of the sourced element is provided from the assessment system to the user device, in other embodiments the assessment system may direct another system to transmit the available version of the sourced element to the user device. At step 842, the user device receives the available version of the selected sourced element from the assessment system (or from one or more other systems).

At step 844, the user device upgrades the sourced element from the current version to the available version received from the assessment system (or from one or more other systems). At step 846, the user device generates an acknowledgment message. At step 848, the user device transmits the acknowledgment message to the assessment system. At step 850, the assessment system receives the acknowledgement message from the user device. Although primarily depicted and described with respect to the case in which the upgrade of the sourced element is successful, in one embodiment, if the upgrade of the sourced element is unsuccessful, the user device may generated and transmit a negative acknowledgement (NACK) message.

At step 852, the assessment system determines whether the final sourced element (i.e., the final sourced element specified in the list of sourced elements selected by the user to be upgraded from the current version to the available version) has been upgraded. If the final sourced element has not been upgraded, method 800 returns to step 838, at which point the assessment system selects another one of the sourced elements selected by the user to be upgraded from the current version to the available version. If the final sourced element has been upgraded, method 800 proceeds to step 852.

At step 854, the assessment system generates an upgrade status report. The upgrade status report may include a status (e.g., Upgrade Successful, Upgrade Partially Complete, Upgrade Failed, and the like) for each sourced element for which an upgrade was attempted. The upgrade status report may also include various statistics associated with each sourced element for which an upgrade was attempted (e.g., total bytes of data transferred, total time required to complete upgrade, and the like, as well as various combinations thereof). At step 856, the assessment system transmits the upgrade status report to the user device. At step 858, the user device receives the upgrade status report from the assessment system. At step 860, the user device presents the upgrade status report to a user interface of the user device such that the user of the user device may review the upgrade status report. At step 862, method 800 ends.

Figure 9:
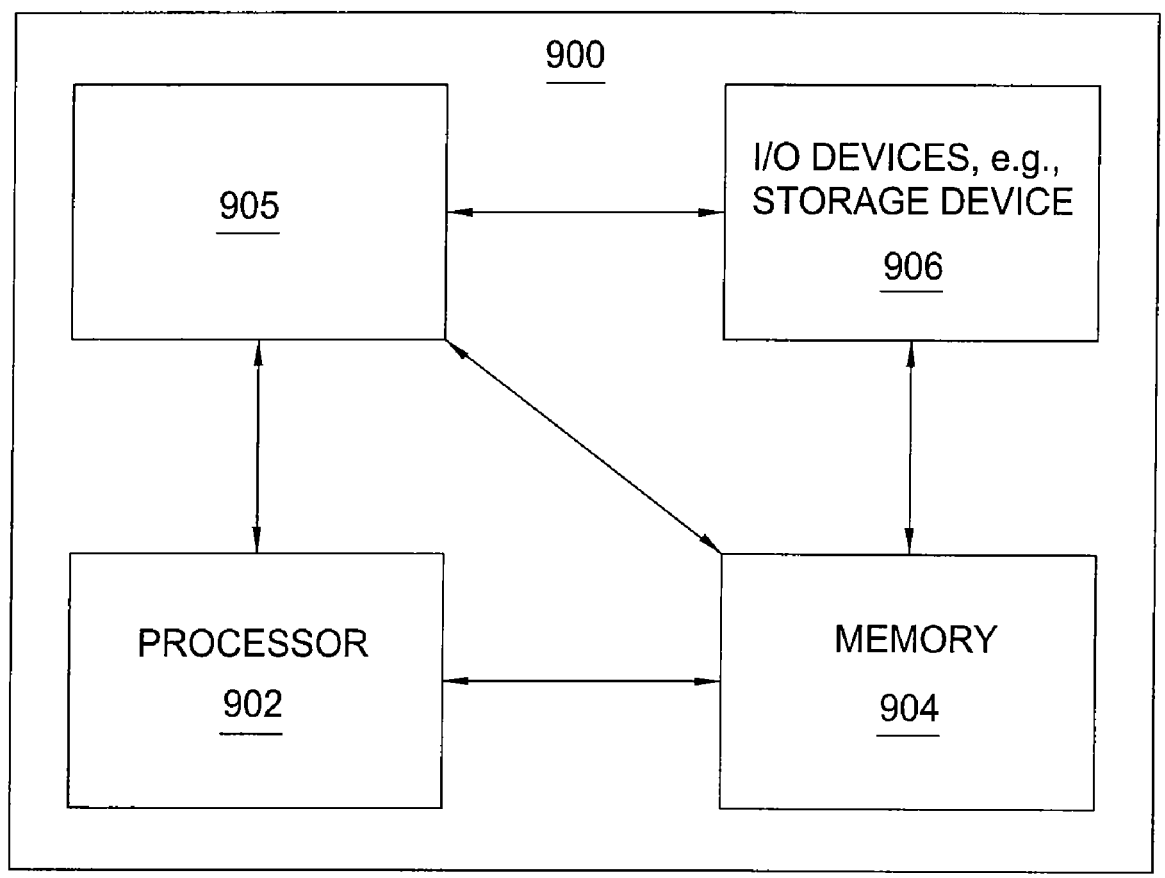
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 comprises a processor element 902 (e.g., a CPU), a memory 904, e.g., random access memory (RAM) and/or read only memory (ROM), a sourced element assessment module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present sourced element assessment process 905 can be loaded into memory 904 and executed by processor 902 to implement the functions as discussed above. As such, sourced element assessment process 905 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A computer readable medium storing a software program, that, when executed by a computer, causes the computer to perform a method for assessing an available version of a sourced element, comprising:
   (a) obtaining a description of the available version of the sourced element;
   (b) identifying a plurality of evaluation items for the available version of the sourced element by evaluating the description using at least one evaluation category comprising a plurality of evaluation parameters; and
   (c) determining an overall assessment of the available version of the sourced element using the identified evaluation items, wherein the overall assessment is indicative of a value of the available version of the sourced element
   wherein the step of identifying the plurality of evaluation items for the sourced element further comprises:
   selecting the at least one evaluation category;
   identifying the evaluation parameters for each selected evaluation category; and
   processing the description using the associated evaluation parameters to identify the evaluation items for each selected evaluation category.

2. The method of claim 1, further comprising:
   determining a current version of the sourced element;
   determining the available version of the sourced element; and
   determining whether the available and current versions of the sourced element are different.

3. The method of claim 1, wherein the description of the available version of the sourced element comprises at least one of a release notes file, a change log file, a readme file, a bug-fix list file, and an error report file.

4. The method of claim 1, wherein identifying the plurality of evaluation items for the sourced element comprises:
   selecting the at least one evaluation category;
   for each selected evaluation category, identifying the evaluation parameters; and
   for each selected evaluation category, processing the description using the associated evaluation parameters to identify the evaluation items.

5. The method of claim 4, wherein, for each selected evaluation category, processing the description using the associated evaluation parameters comprises:
   searching the description using the each of the evaluation parameters, wherein the evaluation parameters comprise keywords; and
   identifying the evaluation items in response to detecting keyword matches in the description.

6. The method of claim 1, wherein determining the overall assessment of the available version of the sourced element comprises:
   identifying assessment information; and
   processing the evaluation items using the assessment information.

7. The method of claim 6, wherein processing the evaluation items using the assessment information comprises:
   prioritizing the evaluation items according to the assessment information.

8. The method of claim 1, wherein the at least one evaluation category comprises at least one of a security category, a reliability category, a stability category, a performance category, and a compatibility category.

9. The method of claim 1, further comprising:
   identifying at least one other available version of the sourced element; and
   repeating steps (a) through (c) for each of the at least one other available version of the sourced element.

10. The method of claim 1, further comprising:
    repeating steps (a) through (c) for each of a plurality of other sourced elements.

11. The method of claim 10, further comprising:
    prioritizing the available versions of the sourced elements using the respective overall assessments of the available versions of the sourced elements to form thereby a prioritized list of the available versions of the sourced elements.

12. The method of claim 11, further comprising:
    selecting one of the available versions of the sourced elements from the prioritized list of the available versions of the sourced elements; and
    upgrading the sourced element from a current version of the sourced element to the available version of the sourced element.

13. An apparatus for determining whether to upgrade a sourced element from a current version to an available version, comprising:
    means for obtaining a description of the available version of the sourced element;

means for identifying a plurality of evaluation items for the available version of the sourced element by evaluating the description using at least one evaluation category comprising a plurality of evaluation parameters; and means for determining an overall assessment of the available version of the sourced element using the identified evaluation items, wherein the overall assessment is indicative of a value of the available version of the sourced element;

wherein the means for identifying the plurality of evaluation items for the sourced element further comprises:

means for selecting the at least one evaluation category;

means for, for each selected evaluation category, identifying the evaluation parameters; and means for, for each selected evaluation category, processing the description using the associated evaluation parameters to identify the evaluation items.

14. The apparatus of claim 13, further comprising:

means for determining a current version of the sourced element;

means for determining the available version of the sourced element; and means for determining whether the available and current versions of the sourced element are different.

15. The apparatus of claim 13, wherein the description of the available version of the sourced element comprises at least one of a release notes file, a change log file, a readme file, a bug-fix list file, and an error report file.

16. The apparatus of claim 13, wherein the means for processing the description using the associated evaluation parameters comprises:

means for searching the description using the each of the evaluation parameters, wherein the evaluation parameters comprise keywords; and means for identifying the evaluation items in response to detecting keyword matches in the description.

17. The apparatus of claim 13, wherein the means for determining the overall assessment of the available version of the sourced element comprises:

means for identifying assessment information; and means for processing the evaluation items using the assessment information.

18. The apparatus of claim 17, wherein the means for processing the evaluation items using the assessment information comprises:

means for prioritizing the evaluation items according to the assessment information.

19. A computer readable medium storing a software program, that, when executed by a computer, causes the computer to perform a method comprising:

(a) obtaining a description of the available version of the sourced element;

(b) identifying a plurality of evaluation items for the available version of the sourced element by evaluating the description using at least one evaluation category comprising a plurality of evaluation parameters wherein the identification step further comprises:

selecting the at least one evaluation category;

identifying the evaluation parameters for each selected evaluation category; and processing the description using the associated evaluation parameters to identify the evaluation items for each selected evaluation category; and (c) determining an overall assessment of the available version of the sourced element using the identified evaluation items, wherein the overall assessment is indicative of a value of the available version of the sourced element.

* * * * *